(12) United States Patent
Rabson et al.

(10) Patent No.: US 8,380,546 B2
(45) Date of Patent: Feb. 19, 2013

(54) MANAGING AN INSURANCE PLAN

(75) Inventors: Kenneth Steven Rabson, Johannesburg (ZA); Herschel Phillip Mayers, Johannesburg (ZA); Adrian Gore, Sandton (ZA)

(73) Assignee: Discovery Life Limited, Sandton (ZA)

( * ) Notice: Subject to any disclaimer, the term of this patent is extended or adjusted under 35 U.S.C. 154(b) by 0 days.

(21) Appl. No.: 12/912,040

(22) Filed: Oct. 26, 2010

(65) Prior Publication Data

US 2011/0119093 A1    May 19, 2011

(30) Foreign Application Priority Data

Oct. 26, 2009 (ZA) ................. 2009/07507

(51) Int. Cl.
*G06Q 40/00* (2006.01)
(52) U.S. Cl. ............................. 705/4; 705/35; 705/36 R
(58) Field of Classification Search ................ 705/4, 35, 705/36 R
See application file for complete search history.

(56) References Cited

U.S. PATENT DOCUMENTS

| | | | |
|---|---|---|---|
| 4,556,216 A | 12/1985 | Ptikanen | |
| 4,699,375 A | 10/1987 | Appelbaum et al. | |
| 4,831,242 A | 5/1989 | Englehardt | |
| 4,831,526 A | 5/1989 | Luchs et al. | |
| 4,837,693 A | 6/1989 | Schotz | |
| 4,860,275 A | 8/1989 | Kakinuma et al. | |
| 4,975,840 A | 12/1990 | DeTore et al. | |
| 5,062,645 A | 11/1991 | Goodman et al. | |
| 5,136,502 A | 8/1992 | Van Remortel et al. | |
| 5,297,026 A | 3/1994 | Hoffman | |
| 5,301,105 A | 4/1994 | Cummings, Jr. | |
| 5,324,077 A | 6/1994 | Kessler et al. | |
| 5,429,506 A | 7/1995 | Brophy et al. | |

(Continued)

FOREIGN PATENT DOCUMENTS

| AU | 2001/276596 | 3/2003 |
|---|---|---|
| AU | 2005/323847 | 2/2007 |

(Continued)

OTHER PUBLICATIONS

Discovery Life—"Benefit version Reference Guide" Oct. 2008.*

(Continued)

*Primary Examiner* — Neal Sereboff
(74) *Attorney, Agent, or Firm* — Fleit Gibbons Gutman Bongini & Bianco, PL; Paul D. Bianco; Gary S. Winer (57) ABSTRACT

A method of managing an insurance policy includes defining a plurality of mechanisms to protect an insured person from adverse financial outcomes. A selection of at least one of the plurality of mechanism is received from the insured person and stored the selection in a memory. On the occurrence of an insured event, the stored selection is retrieved and a basic insurance amount to be paid to the insured person based on an insurance policy of the insured person is calculated. The method then includes determining based on the stored selection of mechanisms if the insured person has suffered any adverse financial outcomes since the inception of the policy and if so then calculating a further financial protector amount to be paid to the insured person based on the stored selection of mechanisms. Finally, the basic insurance amount and further financial protector amount are paid to the insured person or their nominated beneficiary.

20 Claims, 3 Drawing Sheets

U.S. PATENT DOCUMENTS

| | | |
|---|---|---|
| 5,490,260 A | 2/1996 | Miller et al. |
| 5,542,420 A | 8/1996 | Goldman et al. |
| 5,549,117 A | 8/1996 | Tacklind et al. |
| 5,550,734 A | 8/1996 | Tarter et al. |
| 5,574,803 A | 11/1996 | Gaborski et al. |
| 5,630,073 A | 5/1997 | Nolan |
| 5,631,828 A | 5/1997 | Hagan |
| 5,655,085 A | 8/1997 | Ryan et al. |
| 5,655,997 A | 8/1997 | Greenberg et al. |
| 5,692,501 A | 12/1997 | Minturn |
| 5,722,418 A | 3/1998 | Bro |
| 5,745,893 A | 4/1998 | Hill et al. |
| 5,752,236 A | 5/1998 | Sexton et al. |
| 5,774,883 A | 6/1998 | Andersen et al. |
| 5,832,467 A | 11/1998 | Wavish |
| 5,867,821 A | 2/1999 | Ballantyne et al. |
| 5,890,129 A | 3/1999 | Spurgeon |
| 5,933,809 A | 8/1999 | Hunt et al. |
| 5,933,815 A | 8/1999 | Golden |
| 5,937,387 A | 8/1999 | Summerell et al. |
| 5,956,691 A | 9/1999 | Powers |
| 5,987,434 A | 11/1999 | Libman |
| 5,991,744 A | 11/1999 | Dicresce |
| 6,021,397 A | 2/2000 | Jones |
| 6,039,688 A | 3/2000 | Douglas et al. |
| 6,049,772 A | 4/2000 | Payne et al. |
| 6,085,174 A | 7/2000 | Edelman |
| 6,085,976 A | 7/2000 | Sehr |
| 6,108,641 A | 8/2000 | Kenna et al. |
| 6,112,986 A | 9/2000 | Berger et al. |
| 6,151,586 A | 11/2000 | Brown |
| 6,163,770 A | 12/2000 | Gamble et al. |
| 6,230,142 B1 | 5/2001 | Benigno et al. |
| 6,338,042 B1 | 1/2002 | Paizis |
| 6,385,589 B1 | 5/2002 | Trusheim et al. |
| 6,513,532 B2 | 2/2003 | Mault et al. |
| 6,587,829 B1 | 7/2003 | Camarda et al. |
| 6,602,469 B1 | 8/2003 | Maus et al. |
| 6,611,815 B1 | 8/2003 | Lewis et al. |
| 6,965,868 B1 | 11/2005 | Bednarek |
| 7,319,970 B1 | 1/2008 | Simone |
| 7,380,707 B1 | 6/2008 | Fredman |
| 7,383,223 B1 | 6/2008 | Dilip et al. |
| 7,398,217 B2 | 7/2008 | Lewis |
| 7,624,032 B2 | 11/2009 | Radson |
| 7,624,059 B1 | 11/2009 | Jaffarian et al. |
| 7,630,937 B1 | 12/2009 | Mo et al. |
| 7,685,007 B1 | 3/2010 | Jacobson |
| 7,797,175 B2 | 9/2010 | Luedtke |
| 8,131,570 B2 | 3/2012 | Levin |
| 2001/0037214 A1 | 11/2001 | Raskin et al. |
| 2001/0042785 A1 | 11/2001 | Walker et al. |
| 2001/0053984 A1 | 12/2001 | Joyce |
| 2002/0002495 A1 | 1/2002 | Ullman |
| 2002/0013717 A1 | 1/2002 | Ando et al. |
| 2002/0016923 A1 | 2/2002 | Knaus |
| 2002/0029158 A1 | 3/2002 | Wolff et al. |
| 2002/0035486 A1 | 3/2002 | Huyn et al. |
| 2002/0038310 A1 | 3/2002 | Reitberg |
| 2002/0042763 A1 | 4/2002 | Pillay |
| 2002/0049617 A1 | 4/2002 | Lencki et al. |
| 2002/0055859 A1 | 5/2002 | Goodman et al. |
| 2002/0087364 A1 | 7/2002 | Lerner et al. |
| 2002/0103678 A1 | 8/2002 | Burkhalter et al. |
| 2002/0111827 A1 | 8/2002 | Levin et al. |
| 2002/0116231 A1 | 8/2002 | Hele et al. |
| 2002/0116266 A1 | 8/2002 | Marshall |
| 2002/0138309 A1 | 9/2002 | Thomas |
| 2002/0152097 A1 | 10/2002 | Javors |
| 2002/0184129 A1 | 12/2002 | Arena |
| 2003/0009355 A1 | 1/2003 | Gupta |
| 2003/0028483 A1 | 2/2003 | Sanders et al. |
| 2003/0055767 A1 | 3/2003 | Tamura |
| 2003/0065561 A1 | 4/2003 | Brown |
| 2003/0105652 A1 | 6/2003 | Arena |
| 2003/0120521 A1 | 6/2003 | Sherman |
| 2003/0120570 A1 | 6/2003 | Dellinger |
| 2003/0135391 A1 | 7/2003 | Edmundson |
| 2003/0149596 A1 | 8/2003 | Bost |
| 2003/0194071 A1 | 10/2003 | Ramian |
| 2003/0200101 A1 | 10/2003 | Adler |
| 2003/0200142 A1 | 10/2003 | Hicks et al. |
| 2003/0208385 A1 | 11/2003 | Zander |
| 2003/0212579 A1 | 11/2003 | Brown |
| 2003/0233278 A1 | 12/2003 | Marshall |
| 2004/0030625 A1 | 2/2004 | Radson et al. |
| 2004/0039608 A1* | 2/2004 | Mazur et al. ............... 705/4 |
| 2004/0039611 A1 | 2/2004 | Hong |
| 2004/0059608 A1 | 3/2004 | Gore et al. |
| 2004/0088219 A1 | 5/2004 | Sanders et al. |
| 2004/0098279 A1 | 5/2004 | Frazier |
| 2004/0117302 A1 | 6/2004 | Weichert |
| 2004/0138928 A1 | 7/2004 | Monk |
| 2004/0267570 A1 | 12/2004 | Becker et al. |
| 2005/0010453 A1 | 1/2005 | Terlizzi |
| 2005/0033609 A1 | 2/2005 | Yang |
| 2005/0038679 A1 | 2/2005 | Short |
| 2005/0038681 A1 | 2/2005 | Covert |
| 2005/0055249 A1 | 3/2005 | Helitzer |
| 2005/0060209 A1 | 3/2005 | Hill |
| 2005/0071205 A1 | 3/2005 | Terlizzi |
| 2005/0102172 A1 | 5/2005 | Sirmans, Jr. |
| 2005/0131742 A1 | 6/2005 | Hoffman et al. |
| 2005/0222867 A1 | 10/2005 | Underwood |
| 2005/0222877 A1 | 10/2005 | Radson et al. |
| 2005/0222878 A1 | 10/2005 | Radson et al. |
| 2005/0228692 A1 | 10/2005 | Hodgdon |
| 2005/0234742 A1 | 10/2005 | Hodgdon |
| 2005/0240449 A1 | 10/2005 | Rabson et al. |
| 2005/0256748 A1 | 11/2005 | Gore et al. |
| 2005/0288971 A1 | 12/2005 | Cassandra |
| 2006/0041454 A1 | 2/2006 | Matisonn et al. |
| 2006/0064320 A1 | 3/2006 | Postrel |
| 2006/0074801 A1 | 4/2006 | Pollard et al. |
| 2006/0111944 A1* | 5/2006 | Sirmans et al. ............ 705/3 |
| 2006/0129436 A1 | 6/2006 | Short |
| 2006/0143055 A1 | 6/2006 | Loy |
| 2006/0143056 A1 | 6/2006 | Taylor |
| 2006/0218011 A1 | 9/2006 | Walker et al. |
| 2006/0218023 A1* | 9/2006 | Conrad ...................... 705/4 |
| 2007/0027726 A1 | 2/2007 | Warren |
| 2007/0050215 A1 | 3/2007 | Kil |
| 2007/0050217 A1 | 3/2007 | Holden, Jr. |
| 2007/0055601 A1 | 3/2007 | Inderski |
| 2007/0061237 A1 | 3/2007 | Merton |
| 2007/0094125 A1* | 4/2007 | Izyayev ..................... 705/38 |
| 2007/0112669 A1 | 5/2007 | Snyder |
| 2007/0136093 A1 | 6/2007 | Rankin |
| 2007/0233512 A1 | 10/2007 | Gore |
| 2008/0005016 A1 | 1/2008 | Uhlmann |
| 2008/0033751 A1 | 2/2008 | Greene |
| 2008/0046382 A1 | 2/2008 | Metz |
| 2008/0071600 A1 | 3/2008 | Johnson |
| 2008/0082372 A1 | 4/2008 | Burch |
| 2008/0091471 A1 | 4/2008 | Michon |
| 2008/0154650 A1 | 6/2008 | Matisonn et al. |
| 2008/0172214 A1 | 7/2008 | Col |
| 2008/0189141 A1 | 8/2008 | Gore et al. |
| 2008/0197185 A1 | 8/2008 | Cronin et al. |
| 2008/0243558 A1 | 10/2008 | Gupte |
| 2008/0255979 A1 | 10/2008 | Slutzky et al. |
| 2008/0262877 A1 | 10/2008 | Hargroder |
| 2008/0312969 A1 | 12/2008 | Raines |
| 2009/0024419 A1 | 1/2009 | McClellan |
| 2009/0024478 A1 | 1/2009 | Dixon |
| 2009/0037230 A1 | 2/2009 | Tracy |
| 2009/0076903 A1 | 3/2009 | Schwarzberg et al. |
| 2009/0105550 A1 | 4/2009 | Rothman |
| 2009/0150189 A1 | 6/2009 | Barron |
| 2009/0150192 A1 | 6/2009 | Gore et al. |
| 2009/0164256 A1 | 6/2009 | Fisher |
| 2009/0198525 A1 | 8/2009 | Gore et al. |
| 2009/0204441 A1 | 8/2009 | Read |
| 2009/0204446 A1 | 8/2009 | Simon |
| 2009/0204447 A1 | 8/2009 | Tucker |
| 2009/0240532 A1 | 9/2009 | Gore et al. |
| 2009/0259497 A1 | 10/2009 | Gore et al. |

| | | | |
|---|---|---|---|
| 2009/0265183 | A1 | 10/2009 | Pollard et al. |
| 2009/0299773 | A1 | 12/2009 | Gore et al. |
| 2009/0299774 | A1 | 12/2009 | Gore et al. |
| 2009/0299775 | A1 | 12/2009 | Gore et al. |
| 2009/0299776 | A1 | 12/2009 | Gore et al. |
| 2009/0307015 | A1 | 12/2009 | Gore et al. |
| 2010/0023354 | A1 | 1/2010 | Gore et al. |
| 2010/0023384 | A1 | 1/2010 | Pollard et al. |
| 2010/0049541 | A1 | 2/2010 | Pollard et al. |

FOREIGN PATENT DOCUMENTS

| | | |
|---|---|---|
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

Discovery Life—"Discovery Life Group Risk LIFE PLAN".*
WenFin—Web Pages for Discovery Life Nov. 13, 2006.*
Discovery Life "Application for Discovery Card Protector" Nov. 2007.*
Discovery Life "The Discovery Life Portfolio" Nov. 20, 2008.*
Discovery Life "Why Discovery Life" May 29, 2008.*
Discovery Life "Discovery Individual LIFE PLAN Guide" Aug. 4, 2009.*
Discovery Life "The Discovery Life portfolio" Jun. 2008.*
Discovery Invest "Group Retirement Plan Financial solutions for employees" Oct. 17, 2009.*
RC Olmstead, Web Pages from May 2008.*
Discover Life, "Discover Individual Life Planning Guide" Apr. 2009.*
Discover Life, "Discover Life Group Risk Life Plan" Dec. 2009.*
Discovery Life, "The Discovery Life Portfolio" Jun. 2008.*
Discovery Life, "The Discovery Life Portfolio" Nov. 2008.*
Discovery Life, "Why Discovery Life" May 2008.*
BM Link, "Your Company Website" 2006.*
RC Olmstead, "The RCO Difference: A commitment ot Service" May 2006.*
Discovery Invest, "Group Retirement Plan Financial solutions for employees" Jan. 2009.*
Discovery Life, "Application for Discoverycard Protector" Nov. 2007.*
Discovery Life, "Benefit version ref. guide" Oct. 2008.*

International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.

U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
"Sidelines" WWD, p. 10—STIC Scientific and Technical Information Center, Feb. 3, 2000.
019 Co-pending U.S. Appl. No. 11/074,453, Final Office Action mailed Jul. 19, 2010.
Co-pending U.S. Appl. No. 11/189,647, Request for Continued Examination filed Jul. 19, 2010.
Co-pending U.S. Appl. No. 11/715,181, Response filed Aug. 12, 2010.
Co-pending U.S. Appl. No. 12/112,165, Non-final Office Action mailed Sep. 2, 2010.
Co-pending U.S. Appl. No. 10/251,120, Request for Continued Examination filed Oct. 6, 2010.
Co-pending U.S. Appl. No. 12/303,391, Non final Office Action mailed Nov. 24, 2010.
Co-pending U.S. Appl. No. 11/074,453, Response to final office action Dec. 20, 2010.
Co-pending U.S. Appl. No. 09/876,311, Non-final Office Action mailed Jul. 9, 2010.
Discovery Life "The Discovery life Portfolio", 62 pgs—2008.
AFLAC "Personal Disability Income Protector", 6 pgs—Jul. 2003.
R.C. Olmstead, "Our Products" May 2008.
Discovery Life—"Why Discovery Life"—4 pgs—May 29, 2008.
GE Group Life Assurance Company—Group Short Term Disability Insurance—18 pgs, Oct. 29, 2004.
Wenfin Financial Services, "Discovery Life Plan" www.bmlink.co.za/WenFininsurance—Website download, 58 pgs, Aug. 5, 2011.
EconEdLink—"How Long is Your life?"—Tutorial from EconEdLink.com web-site, 4 pgs, posted Sep. 13, 2004.
AFLAC—"Personal Cancer Indemnity Plan" Level 3, 11 pgs, Jun. 2005.
Gendell Murray, "Retirement age Declines again in 1990s", Monthly Labor Review, 10 pgs, Oct. 2001.
Discovery Life "Benefit version Reference Guide" Oct. 2008.
WenfinWebPages for Discovery Life Nov. 13, 2006.
AFLAC—Discovery Life "Application for Discovery Card Protector" Nov. 2007.
Discovery Life "The Disovery Life Portfolio" Nov. 20, 2008.
Discovery Life "Discovery Individual LIE PLAN Guide" Aug. 4, 2009 EconEdLink—How Long is Your life?—Tutorial from EconEdLink.com web-site, posted Sep. 13, 2004.
Discovery Invest Group Retirement {Plan Financial Solutions for employees: Oct. 17, 2009.
ATG Customer Success Story: Discovery Heathly 2006 ART Tech Group, Inc.
Discovery Vitality; Discovery Vitality 2009 Sep. 12, 2008.
Discovery Invest, Group Retirement Plan Finanical solutions for employees Jan. 17, 2009.
Baker et al. Pay for Performance Incentive Programs in Healthcare; Market Dynammics and Business Process-Research Report 2003.
PruHealth, Individual Policy Document Jul. 2008.
Discovery Vitality, Lesson Plans Grade 4 nad 5 Apr. 2, 2008.
HLC Financial Services, Discovery News Feb. 2009.
The Discovery Life, "Technical guide for financial advisers" Nov. 2008.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
"Absenteeism Control"; Cole, Thomas C. et al; Management Decision; London: 1992. vol. 20, Iss. 2; p. 12(AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwemedicalexams.aspx.
Definition of insurance, New Penguin Business Dictionary, Retreieved Oct. 26, 2008 from http://www.credoreference.com/entry/6892512/.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.

U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. App. No. 12/477,213, filed Jun. 3, 2009.
U.S. Appl. No. 12/477,225, filed Jun. 3, 2009.
U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009, filed Oct. 26, 2010.
U.S. Appl. No. 12/912,040, filed Oct. 26, 2010.
U.S. Appl. No. 12/112,165, Final Rejection Feb. 10, 2011.
U.S. Appl. No. 11/715,181, Response to Office Action Mar. 11, 2011.
U.S. Appl. No. 12/303,388, Non-Final Office Action mailed Mar. 11, 2011.
U.S. Appl. No. 12/477,225, Non-final Office Action Mar. 25, 2011.
U.S. Appl. No. 12/122,549, Non-final Office Action Mar. 30, 2011.
U.S. Appl. No. 12/333,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.
U.S. Appl. No. 12/122,549, Response filed Jul. 21, 2011.
U.S. Appl. No. 12/303,388 Final Office Action Jul. 5, 2011.
U.S. Appl. No. 11/189,647, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/477,208, Non final office action Jul. 22, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.
U.S. Appl. No. 12/477,213 Non Final Office Action Aug. 9, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/333,465 Final Office Action Oct. 4, 2011.
U.S. Appl. No. 12/477,179, Response filed Oct. 24, 2011.
U.S. Appl. No. 12/122,549, Final Office Action Oct. 6, 2011.
U.S. Appl. No. 11/074,453, Office Action Oct. 11, 2011.
U.S. Appl. No. 12/912,040, Office Action Oct. 20, 2011.
U.S. Appl. No. 12/441,447, Response filed Nov. 1, 2011.
U.S. Appl. No. 12/477,189, Response filed Nov. 4, 2011.
U.S. Appl. No. 12/721,619, Preliminary Amendment filed Nov. 3, 2011.
U.S. Appl. No. 11/903,607, Office Action Nov. 30, 2011.
U.S. Appl. No. 12/477,189 Final Office Action Dec. 5, 2011.
U.S. Appl. No. 12/912,009 Non-final Office Action Dec. 19, 2011.
U.S. Appl. No. 11/794,830, Non-Final Rejection Dec. 19, 2011.
U.S. Appl. No. 12/122,549, RCE response Jan. 6, 2012.
U.S. Appl. No. 11/074,453, Response filed Jan. 11, 2012.
Gore, The case for Consumer Engagement in the funding of Healthcare IAAHS 2007.
Preferred Health Systems—Preferred News—vol. 9, issue 1, Spring 2008.
Discovery Why Discovery Life May 29, 2008.
BX Link Your Company Websites Discovery Life Plans Jan. 13, 2003.
Destiny Health Individual Brochure Health Coverage modified Oct. 18, 2006.
DaSilva Roseanne The Impact of Wellness Activities on Hospital Claims Experience, Joint Colloquium of the IACA, PBSS and IAAHS May 2008 Oct. 1, 2004.
M. Doty et al., Issue Brief, Maintaining Health Insurance During a Recession, 6 pgs, 2001.
R. Merhr, ARIA—The Concept of the Level—Premium Whole Life Insurance Policy, The Journal of Risk and Insurance, vol. 42, No. 3 (Sep. 1975) pp. 419-431.
STIC Search Report EIC 3600, Scientific and Technical Information Center, 63 pgs.
Web-site Google Search Google Employee Wellness Payment dated Feb. 12, 2012.
Wellness Source—How Much Does a Good Wellness Program Cost? 2 pgs.
South African Patent Journal No. 6 of 1 , Jun. 2099, vol. 42, p. 229.
South African Patent Application 2008/04810 filed Jun.26, 2009— Annotated with Paragragh numbers.
South African Patents Act, No. 57 of 1978 as amended by Patents Amendment Act No. 58 of 2002.
Discovery Life, " Technical guide for financial advisers" Nov. 11, 2009.
U.S. Appl. No. 13/638,608, filed Sep. 30, 2012.
U.S. Appl. No. 13/648,309, filed Oct. 10, 2012.
U.S. Appl. No. 13/641,143, filed Oct. 15, 2012.
U.S. Appl. No. 13/641,145, filed Oct. 15, 2012.
U.S. Appl. No. 13/641,155, filed Oct. 15, 2012.
U.S. Appl. No. 12/912,009 Response filed Aug. 31, 2012.
Flexible Spending Account, from Wikipedia encyclopedia, pp. 7, retrieved Sep. 28, 2012.
Article, Health Care Spending Accounts, AHIP America's Health Insurance Plans, pp. 12, retrieved Sep. 28, 2012.
Health Reimbursement Account, from Wikipedia encyclopedia, pp. 4, retrieved Sep. 28, 2012.
Health Savings Account, from Wikipedia encyclopedia, pp. 10, retrieved Sep. 28, 2012.
Saleem—Article, Health Spending Accounts, U.S. Bureau of Labor Statistics, pp. 5, retrieved Sep. 28, 2012.
Long-Term Insurance Act, No. 52, Jan. 1,1998, Administration of Act, 55 pgs.
Government Gazette, Republic of South Africa, Insurance laws Amendment Act 2008, vol. 521, Cape Town, Nov 5, 2008, No. 31578, 36 pgs.
Regulation Gazette No. 6652, Government Notice, Medical Schemes Act, vol. 412, Oct. 20, 1999, 67 pgs.
Government Gazette, Republic of South Africa, Staatskoerant, Cape Town, vol. 399, Sep. 23, 1998, No. 19277, 49 pgs.

* cited by examiner

MANAGING AN INSURANCE PLAN

CROSS REFERENCE TO RELATED APPLICATIONS

This application claims the benefit of related South African Patent Application ZA 2009/07507, filed Oct. 26, 2009, the contents of which are incorporated herein by reference.

FIELD OF THE INVENTION

The invention relates to managing life insurance and life insurance benefits.

BACKGROUND OF THE INVENTION

Conventionally, insurance policies such as life insurance policies operate on the basis that an insured person, sometimes referred to as an insured life, pays a premium to the life insurer, and the life insurer pays a predetermined sum, referred to as the sum assured, to the insured life or his/her beneficiary on the occurrence of an insured event. Typical insured events are the insured life suffering disability, contracting a dread disease or dying.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

SUMMARY OF THE INVENTION

According to one example embodiment a method of managing an insurance policy includes:

defining a plurality of mechanisms to protect an insured person from adverse financial outcomes;

receiving a selection of at least one of the plurality of mechanism from the insured person and storing the selection in a memory;

on the occurrence of an insured event, retrieving the stored selection;

calculating a basic insurance amount to be paid to the insured person based on an insurance policy of the insured person;

determining based on the stored selection of mechanisms if the insured person has suffered any adverse financial outcomes since the inception of the policy and if so then calculating a further financial protector amount to be paid to the insured person based on the stored selection of mechanisms; and paying the basic insurance amount and further financial protector amount to the insured person or their nominated beneficiary.

The plurality of mechanisms may include at least some of an asset protector, a debt installment protector and a currency protector.

The method may further include:

monitoring the compliance of the insured person with a wellness program; and altering the further financial protector amount based on the insured person's compliance with the wellness program.

According to another example embodiment a system for managing an insurance policy includes:

a memory for storing a policy inception interest rate level which is an interest rate level payable on debt of the insured person;

an interest rate determining module to determine after the policy inception an interest rate level payable on debt of the insured person at that time;

a comparator module to compare the determined interest rate level with the inception interest rate level;

a calculating module to calculate a debt protector amount to be paid to the insured person if the determined interest rate level is higher than the inception interest rate level; and a payment module to pay the debt protector amount to the insured person or their nominated beneficiary on the occurrence of an insured event.

The plurality of mechanisms may include at least some of an asset protector, a debt installment protector and a currency protector.

The system may further include:

a monitoring module to monitor the compliance of the insured person with a wellness program; and the calculation module altering the further financial protector amount based on the insured person's compliance with the wellness program.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The systems and methodologies described herein relate to a system and method of managing an insurance scheme such as a life insurance scheme.

The present invention may be implemented by a traditional life insurance plan operator for its members or may be implemented by another party.

Conventional life insurance schemes operate on the basis that an insured person, referred to as the insured life, pays premiums on a regular basis to the life insurer, specifying a sum assured which is an amount to be paid out on the occurrence of an insured event. For example, on the death of the insured life, a predetermined death benefit is paid to the nominated beneficiaries of the insured life. If the insured life is disabled or suffers a dread disease, a different, lesser amount is paid out.

The invention addresses the effect that during the time between the purchase of insurance, and a claim under that insurance policy, the insured life's financial position may change negatively, resulting in the undesired outcome that the insurance received by them does not cover their needs. Thus, the quantum of insurance purchased in the event of any insurable event may be correct at the inception of the policy, but may not be sufficient after changes in an insured's financial position. The invention provides a system and method of managing an insurance scheme to address this.

The method and system will be described with reference to these kinds of schemes but it will be appreciated that the method and system could equally be applied to other types of insurance schemes.

It will also be appreciated that the system and methodology may be implemented by any relevant person or organisation. For example, the system and methodology may be operated by the organisation which operates the life insurance scheme or may be implemented by another associated organisation. In one example the system and methodology may be implemented by a financial organisation which issues credit cards to its members.

For purposes of illustration, the system and methodology will be described herein as being operated by the managers of a life insurance scheme.

A plurality of life changing events are defined. The plurality of life changing events in the example includes disability, contracting a dread disease or dying as these are typical of the kind of events which are insured by life insurance schemes. However, it will be appreciated that in other contexts these life changing events may be other events such as the birth of a child or changing jobs to name but a few examples.

However, during the time between the purchase of the insurance and a claim to the insurance the insured life financial position may change negatively resulting in the undesired outcome that the insurance received by them does not cover their needs.

Thus, the quantum of insurance purchased in the event of any insurable event may be correct at the inception of the policy but may not be sufficient after changes in their financial position.

Figure 1:
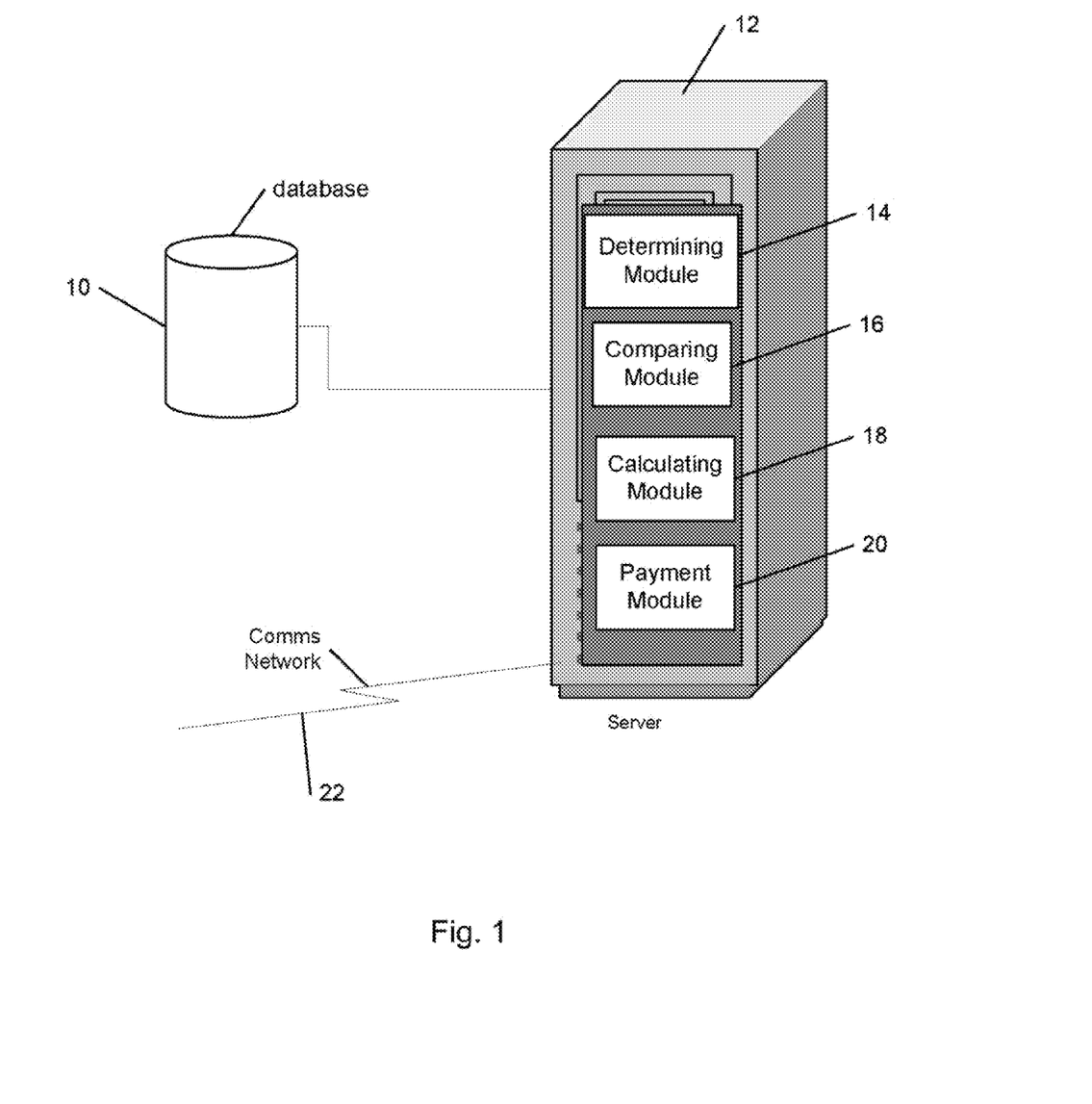
FIG. 1 is a block diagram illustrating an example system to implement the methodologies described herein.

Referring to FIG. 1 of the accompanying Figures, an exemplary system for implementing the above methodologies is shown.

The system includes a server 12 which includes a number of modules to implement the methodologies described herein.

The modules described may be implemented by a machine-readable medium embodying instructions which, when executed by a machine, cause the machine to perform any of the methods described above.

It will be appreciated that embodiments of the present invention are not limited to such architecture, and could equally well find application in a distributed, or peer-to-peer, architecture system. Thus the modules illustrated could be located on one or more servers operated by one or more institutions.

The system implements a method of managing an insurance policy and includes a memory 10 associated with the server 12.

In the accompanying drawings, the memory is illustrated as a database 10. It will be appreciated that the memory could take any other suitable form.

A plurality of mechanisms to protect an insured person from adverse financial outcomes are defined and stored in the memory 10.

In one example embodiment, the plurality of mechanisms include at least some of an asset protector, a debt installment protector, a currency protector, a credit or debit card interest protector, a severe illness medical booster and a cash payout mechanism. These will be described in more detail below.

The server 12 receives typically via a communications network 22 a selection of at least one of the plurality of mechanisms from the insured person and stores the selection in a memory.

It will be appreciated that the insured person could select the required mechanism or mechanisms using a computer to access the server 12 over the communications network 22. Alternatively, this could be done by the insured person instructing a third party insurance sales person to make the necessary selection. These are but a few examples of how this could be implemented.

It will also be appreciated that a default setting could be implemented, for example that all of the mechanisms on offer are included unless the insured person indicates to the contrary.

On the occurrence of an insured event, the stored selection is retrieved and a basic insurance amount to be paid to the insured person based on an insurance policy of the insured person is determined by a determining module 14.

The determining module 14 then determines, based on the stored selection of mechanisms if the insured person has suffered any adverse financial outcomes since the inception of the policy. If so then calculating module 18 calculates a further financial protector amount to be paid to the insured person based on the stored selection of mechanisms.

A payment module 20 pays the basic insurance amount and a further financial protector amount to the insured person or their nominated beneficiary.

A few example financial protection mechanisms will now be described. However, it should be appreciated that other financial protection mechanisms could be incorporated into the present invention.

The exemplary financial protection mechanisms will be referred to as an asset fall protector, a currency protector and a debt installment protector.

Describing firstly the asset fall protector, a notional starting value is recorded in the memory 10. On the occurrence of a claim to the insurer, the calculating module 18 performs a calculation to determine how the notional starting value would have incremented if invested in a moderate growth investment fund as opposed to simply increasing at the rate of CPI. Therefore, the calculation module calculates a first amount being an amount to which the notional starting value would have grown if invested in a moderate fund between the inception of the insurance policy and the claim.

Next, the calculating module 18 calculates a second amount being an amount to which the notional starting value would have grown if invested in a bank account with an interest rate equal to CPI between the inception of the insurance policy and the claim.

If the second amount is larger than the first amount this indicates that typical moderate growth fund type investments have not performed over the life of the insurance policy as expected and it is therefore likely that the insured person's other assets invested in such funds would have also not performed as anticipated at the policy inception.

This is therefore an indication that the insured person has suffered an adverse financial outcome.

In this scenario, an extra payment is made which is referred to herein as a financial protector amount.

If the first amount is larger than the second amount this indicates that typical fund investments have indeed performed over the life of the insurance policy and it is therefore likely that the insured person's other assets invested in such funds have also performed as anticipated at the policy inception and that the insured person has not suffered any adverse financial outcome due to this reason.

The quantum of the financial protector amount can be determined in a number of ways.

One example would be to calculate the difference between the first amount and the second amount and to pay this difference to the insured person.

The currency protector mechanism of the illustrated embodiment works as follows. To illustrate this example the currencies used will be the South African rand and the US dollar.

At the inception of the policy a notional amount of South African rands are converted to US dollars by the calculation module 18. This inception dollar value is stored in the memory 10.

On the occurrence of a claim to the insurer, the calculating module 18 performs a calculation to determine what the notional amount of South African rands would be when converted to US dollars at the time of the claim.

If this US dollar amount is less than the inception US dollar amount stored in the memory 10 then the insured person has suffered an adverse financial outcome due to the depreciation of their home currency with respect to a foreign currency.

In this scenario, an extra financial protector payment is made.

Again, the quantum of the financial protector amount can be determined in a number of ways.

One example would be to calculate the difference between the US dollar amount at the policy inception and the US dollar amount at the time of the claim and to pay this difference to the insured person.

Another example of a financial protection mechanism is the debt installment protector.

In this example, a policy inception interest rate level is determined by the determining module 14 and stored in the memory 10.

The determined inception interest rate level may be set by one or more financial institutions or may be set by a regional authority such as a government in a country.

In South Africa, the interest rate level is set by the relevant financial institution but is linked to an interest rate set by the South African Reserve Bank and is usually slightly higher than the interest rate set by the Reserve Bank.

In any event, what is important about the interest rate level is that this determines the interest amount payable by the insured person if they have any debt. Therefore, any increase in the interest rate effectively means that the insured person will require more money to service their debt and will have less free money available to finance their living expenses.

In order to protect against this, the method includes determining after the policy inception an interest rate level payable on debt of the insured person at that time.

The interest rate level can again be obtained by determining module 14 accessing an official database or website to obtain this information or by receiving this information via communications network 22.

A comparing module 16 compares the determined interest rate level with the inception interest rate level and if the determined interest rate level is higher than the inception interest rate level then it is assumed that the insured person will have suffered an adverse financial outcome since they will be paying more interest on any debt they may have.

In this scenario, a financial protector amount is again calculated and paid to the insured person.

It is envisaged that the methodology will be implemented by periodically determining after the policy inception an interest rate level payable on debt of the insured person at that time. One example of periodically is monthly.

In this example, the determined interest rate level is each time compared with the inception interest rate level and if the determined interest rate level is higher than the inception interest rate level then a debt protector amount to be paid to the insured person is calculated by the calculating module 18.

However, in this example, the calculating module 18 will also add the calculated debt protector amount to any previous periodically calculated debt protector amounts to arrive at a total debt protector amount.

On the occurrence of an insured event the total debt protector amount will be paid to the insured person or their nominated beneficiary as the financial protector amount.

As described above, it will be appreciated that at the time of the insurance policy inception the insured person selects one or more of the plurality of mechanisms to protect themselves from adverse financial outcomes.

Even if the insured person selects a plurality of mechanisms there may in fact have been no adverse financial outcomes in which case they will obtain no further insurance payment.

Alternatively, only a single one of the plurality of mechanisms selected may result in a further insurance payment being made.

Finally, all of the plurality of mechanisms selected may result in a further insurance payment being made in which case each of the amounts calculated for each of the mechanisms will be added together to arrive at a total further financial protector insurance payment.

A payment module 20 then pays the further financial protector payment amount to the insured person or their nominated beneficiary.

In one example, this is implemented by the payment module 20 communicating via a communications network 22 with a server of a financial institution (not shown) and instructing the server of the financial institution to pay the insured person or their nominated beneficiary.

In a further example embodiment, if the insured person reaches a predetermined age the financial protector amount is paid out to the insured person or their nominated beneficiary.

An example of the predetermined age may be a retirement age such as 65.

Thus the benefit described essentially implements a fund that pays out at age 65 or on earlier death or other insurance claim of the insured person and the funds build up if there are adverse financial events that could impact on the insured persons' financial wealth.

In addition, the compliance of the insured person with a wellness program may be monitored and may play a part in the calculating of the further financial protector amount.

An example of such a wellness program is presently managed by the applicant that manages a traditional life and health insurance plan together with their wellness program disclosed in the applicant's South African granted patent number ZA 99/1746, the contents of which are incorporated herein by reference.

In an example wellness program, members participate in approved related facilities and/or services. For example, members use gymnasiums, Smoke Enders™ and Weigh-less™

In one example, members are awarded points and depending on the total number of points allocated to a member, they fall within one of five statuses. In the implementation of the wellness program, these statuses have been named in ascending order of value, blue, bronze, silver, gold and diamond. All members are placed initially in the blue status. Once a member has accumulated a predetermined number of points, his/her status is upgraded to the next appropriate level.

It will be appreciated that for purposes of the present invention the wellness program could be operated by the insurer or could be operated by a third party that operates the wellness program and then informs the insurer of the degree of participation of the insured person with the wellness program.

This could occur by a third party transmitting data to at least one server operated by the insurer. The data is received by a monitoring module (not shown) at the at least one server 12 and stored in a database associated with the at least one server, typically database 10.

In one example the data will include at least an identity of the insured person and data identifying the status of the insured person, for example blue, bronze, silver, gold and diamond.

In order to determine the status, a monitoring of the compliance of the insured person with the wellness program includes receiving insured person usage information associated with the insured person's usage of the wellness program and determining, based on the usage information, a status level associated with the insured person for the wellness program, wherein the status level indicates a degree of participation in the wellness program The usage information received may include information associated with a plurality of separate and distinct occurrences of wellness program participation by the insured person.

In addition, the method may further include determining a status level associated with the insured person that further includes receiving the usage information from an information processing system and assigning a given point value to each separate and distinct occurrence of wellness program participation.

A total point value is determined based on an accumulation of each given point value assigned to each separate and distinct occurrence of wellness program participation The total point value is then compared to a plurality of point ranges, each point range in the plurality of point ranges being associated with a status level and identifying a point range in the plurality of point ranges corresponding to the total point value.

Finally, a status level is assigned that is associated with the point range that has been identified to the at least one employee.

This status level is then used to answer the financial protector amount owing to the insured person whereby the higher the insured person's status level, the greater the financial protector amount payable.

One method of implementing the above described methodology is as follows.

The insured person selects between two options. In one example, the first option is 20% of their basic insured amount and the second option is 40% of the basic insured amount.

Using the second option as an illustrative example and using a basic insured amount of R1,000,000 for illustrative purposes. The insured person is provided with a table of options from which to select as follows:

|  | Debt Protector | Assets Protector | Currency Protector |
| --- | --- | --- | --- |
| Protector Combination* | 3% | 30% | 20% |
| 100% Asset Protector | 0% | 100% | 0% |
| 100% Currency Protector | 0% | 0% | 100% |
| 100% Debt Instalment Protector | 7.5% | 0% | 0% |

If the insured person selects the first option they will get a combination of protectors which in this example embodiment will be implemented as set out below. However, they have the option of selecting only one of the mechanisms available and then 100% of the allocation will be to that mechanism as shown.

Referring first to the debt protector mechanism, since in this example the insured person has selected the 40% option of a R1,000,000 basic fund, this equates to an amount of R400,000. 3% of R400,000 is equal to R12,000 and this is assumed to be the notional monthly debt installment that the insured person is required to pay.

An increase in interest rate levels then uses this notional monthly debt installment as follows:

| Increase in prime interest rate | Percentage of insured installment paid | Example of monthly benefit of 20% on R1m Life Fund | Example of monthly benefit of 40% on R1m Life Fund |
| --- | --- | --- | --- |
| <=0.5% | 0% | — | — |
| [0.5%, 1.5%) | 4% | 240 | 480 |
| [1.5%, 2.5%) | 8% | 480 | 960 |
| [2.5%, 3.5%) | 12% | 720 | 1,440 |
| [3.5%, 4.5%) | 16% | 960 | 1,920 |
| [4.5%, 5.5%) | 22% | 1,320 | 2,640 |
| [5.5%, 6.5%) | 26% | 1,560 | 3,120 |
| [6.5%, 7.5%) | 30% | 1,800 | 3,600 |
| [7.5%, 8.5%) | 35% | 2,100 | 4,200 |
| [8.5%, 9.5%) | 40% | 2,400 | 4,800 |
| [9.5%, 10%) | 45% | 2,700 | 5,400 |
| >=10% | 50% | 3,000 | 6,000 |
| Max Total Accumulation |  | 36,000 | 72,000 |

Thus, if the interest rate increases by 1% in a given month then R480 will be the calculated amount payable to the insured person for that month.

A record of this amount will be stored in the memory 10 and as each month goes by, if the interest rate is higher than the starting interest rate a further amount will be added to this amount and the total will grow.

The last row in the table indicates a maximum total accumulation which is an upper limit for this benefit.

Referring next to the asset protector, and referring to the first table above, in this example 30% of the R400,000 is allocated to the asset protector mechanism which is a total of R120,000. This amount of R120,000 is the amount that is assumed to be invested in a moderate fund and in a bank account with an interest rate according to CPI applying. If a financial protector amount as described above becomes payable due to the poor performance of the moderate fund, this will be the difference between the amount banked at CPI less the amount invested in a moderate fund which will need to be not performing for there to be any payout.

There may also be a limit applied to this payment based on age so that even if the moderate fund decreased significantly, the amount paid to the insured person would be reduced.

Referring to the currency protector, 20% of the R400,000 equates to R80,000.

The calculation model 18 converts this amount at the inception of the insurance policy to a dollar amount. For illustrative purposes, using an exchange rate of 8:1 this would equate to a dollar amount of USD 10,000.

This amount is stored in the memory 10.

At the time of an insurance claim, the calculation model uses the exchange rate at that time to again calculate the dollar amount equating to R80,000. If this amount is less than the original USD 10,000 then the insured person has suffered an adverse financial outcome and will be paid a further financial protector amount.

One example of how to calculate the amount is to pay the insured person the rand difference to allow them to purchase the USD10,000 so that they have suffered no loss.

In one example, the financial protector amount need not be linked to any premium payments. Alternatively, this amount may be linked to a premium payment so that the larger the premium payment the larger the amount payable as the financial protector amount.

In another example, the further financial protector amount can be linked to the compliance of the insured person with the wellness program described above so that the better the compliance with the wellness program the larger the financial protector amount.

Figure 2:
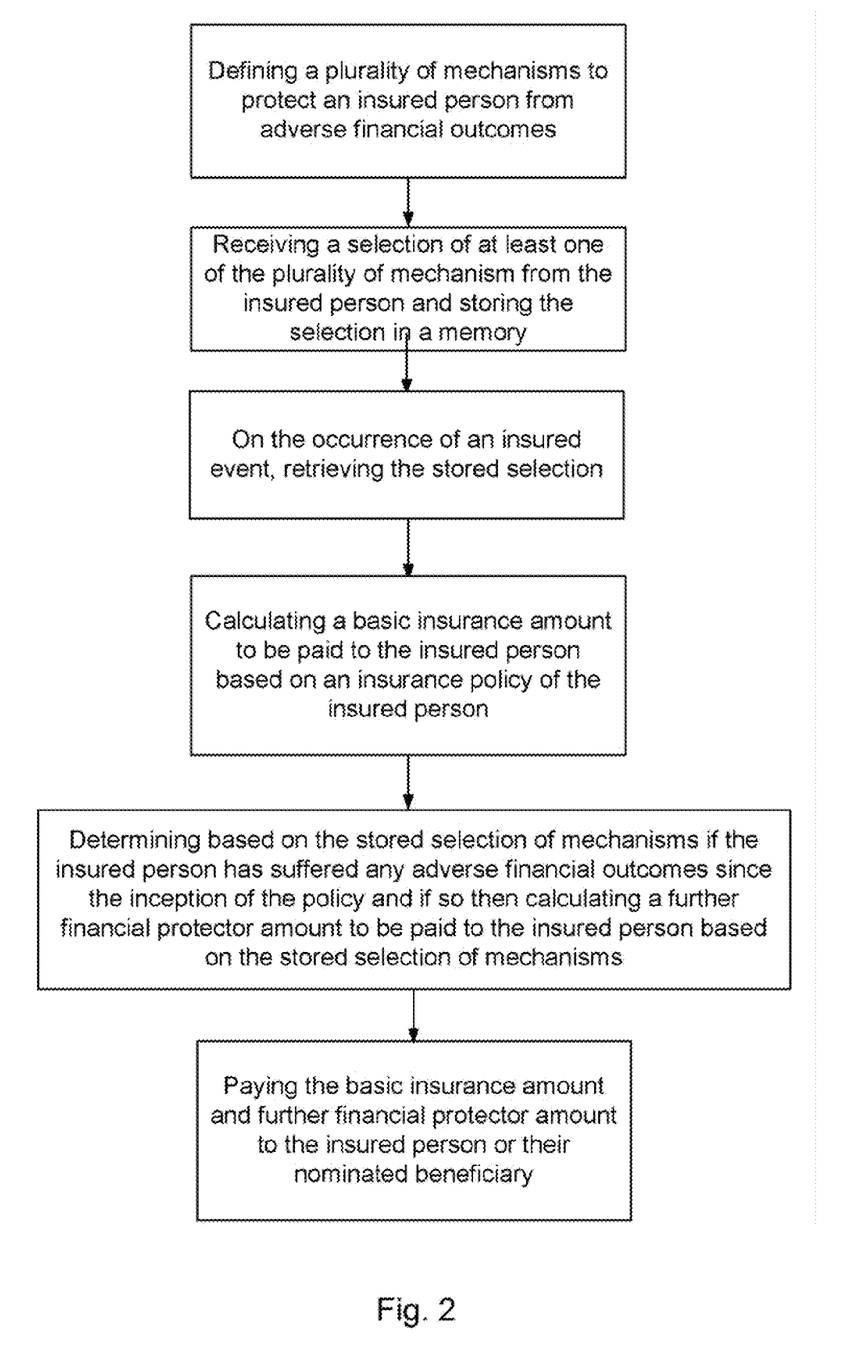
FIG. 2 is a block diagram illustrating an example method of managing an insurance scheme.
Figure 3:
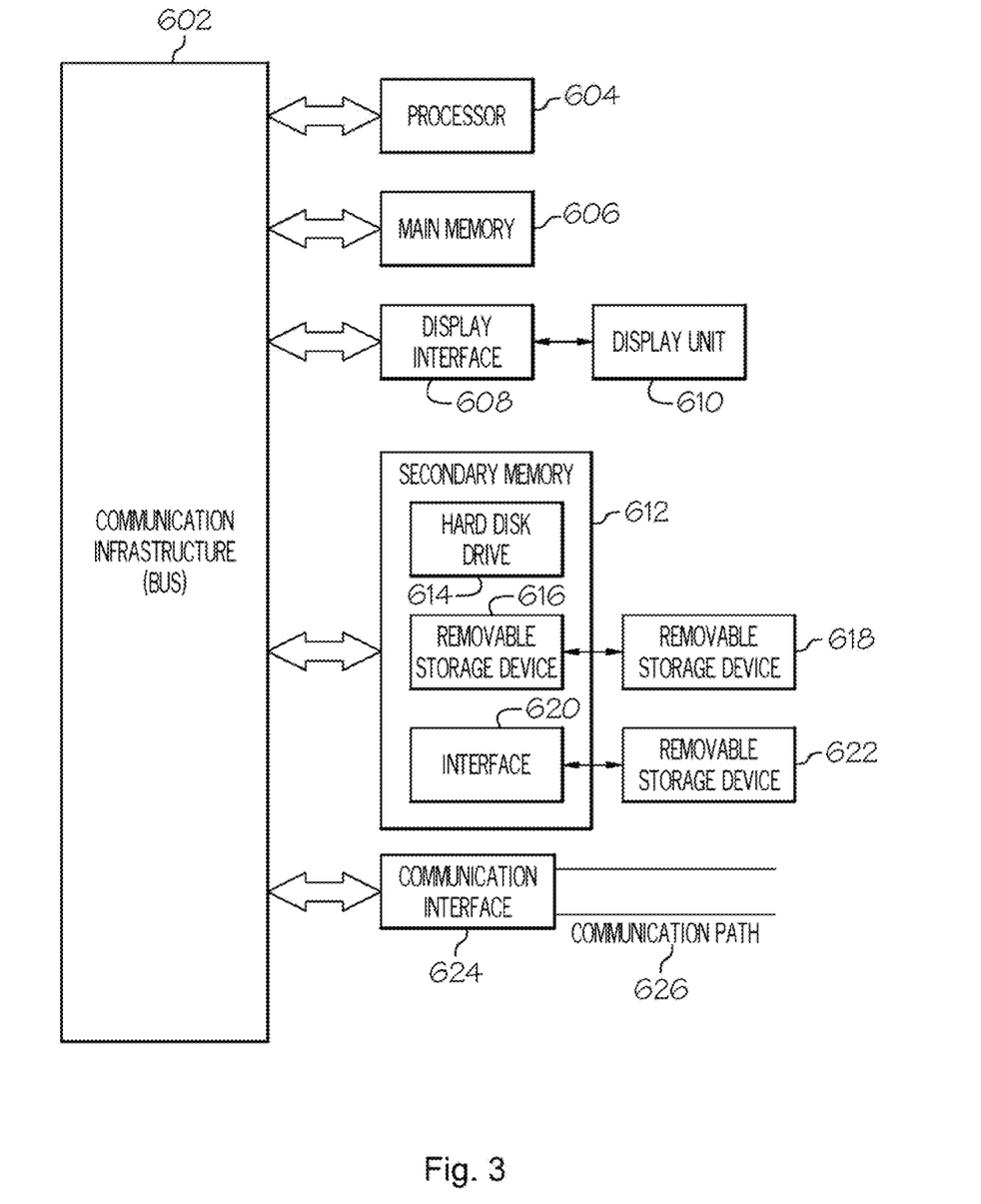
FIG. 3 is a block diagram illustrating a detailed view of an information processing system according to one embodiment of the present invention.

FIG. 3 is a high level block diagram illustrating a more detailed view of a computing system 600 of the invention, such as any of the information processing systems of the invention, including for example the system described with respect to FIG. 1, or for carrying out the methods of the invention, for example the method as described with respect to FIG. 2.

The computing system 600 is based upon a suitably configured processing system adapted to implement an exemplary embodiment of the present invention. For example, a personal computer, workstation, or the like, may be used. In one embodiment of the present invention, the computing system 600 includes one or more processors, such as processor 604. The processor 604 is connected to a communication infrastructure 602 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 600 can include a display interface 608 that forwards graphics, text, and other data from the communication infrastructure 602 (or from a frame buffer) for display on the display unit 610. The computing system 400 also includes a main memory 606, preferably random access memory (RAM), and may also include a secondary memory 612 as well as various caches and auxiliary memory as are normally found in computer systems. The secondary memory 612 may include, for example, a hard disk drive 614 and/or a removable storage drive 616, representing a floppy disk drive, a magnetic tape drive, an optical disk drive, and the like. The removable storage drive 616 reads from and/or writes to a removable storage unit 618 in a manner well known to those having ordinary skill in the art.

Removable storage unit 618, represents a floppy disk, a compact disc, magnetic tape, optical disk, etc. which is read by and written to by removable storage drive 616. As are appreciated, the removable storage unit 618 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 612 may include other similar means for allowing computer programs or other instructions to be loaded into the computing system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computing system 600.

The computing system 600, in this example, includes a communications interface 624 that acts as an input and output and allows software and data to be transferred between the computing system 600 and external devices or access points via a communications path 626. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. The signals are provided to communications interface 624 via a communications path (i.e., channel) 626. The channel 626 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 606 and secondary memory 612, removable storage drive 616, and a hard disk installed in hard disk drive 614. The computer program products are means for providing software to the computer system. The computer readable medium allows the computer system to read data, instructions, messages or message packets, and other computer readable information from the computer readable medium.

Computer programs (also called computer control logic) are stored in main memory 406 and/or secondary memory 612. Computer programs may also be received via communications interface 624. Such computer programs, when executed, enable the computer system to perform the features of the various embodiments of the present invention as discussed herein. In particular, the computer programs, when executed, enable the processor 604 to perform the features of the computer system.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A method of managing an insurance policy, comprising:
using software executing within at least one computer from non-transitory storage medium, the software configured for
receiving data pertaining to coverage for one or more insured events for an insured person under the insurance policy;
receiving data pertaining to additional coverage under the insurance policy based upon at least one financial indicator selected from the group consisting of (a) an investment fund compared to a published price index, (b) a change in value between a local currency and a foreign currency, and (c) an interest rate level published by an authority;
calculating a basic insurance amount to be paid to the insured person based on the occurrence of an insured event under the policy of for the insured person,
determining, for the selected at least one financial indicator at the end of a given time period,
if (a) is selected, if the interest rate of the investment performance is lower than the rate of the published price index,
if (b) is selected, if the local currency is of lower value as compared to the foreign currency relative to the start of the given time period, or
if (c) is selected, if the interest rate level published is lower relative to the start of the given time period, since the inception of the policy, and
if the selected financial indicator is lower, then calculating an additional coverage benefit amount to be paid to the insured person on the occurrence of the insured event, based on a function of the extent of lowering of the selection and a predetermined notional starting value which is not the basic insurance amount or an actual investment amount; and
causing the basic insurance amount and the additional coverage amount to be paid to the insured person or their nominated beneficiary.

2. A method according to claim 1, further including:
monitoring the compliance of the insured person with a wellness program; and
altering the additional coverage benefit amount based on the insured person's compliance with the wellness program.

3. The method of claim 2, wherein the monitoring is not performed by the insured.

4. The method of claim 1, wherein the predetermined starting value is determined based upon the financial obligations of the insured at a predetermined date.

5. The method of claim 1, wherein the insured event is selected from the group consisting of disease, disability, and death.

6. The method of claim 1, wherein the authority is a government, regional authority, or financial institution.

7. The method of claim 1, wherein the predetermined starting value is a notional value determined by the insured for a desired level of coverage.

8. The method of claim 1, wherein the predetermined starting value is based upon financial obligations of the insured.

9. The method of claim 1, wherein the additional coverage amount is paid in installments over time.

10. The method of claim 1, wherein the additional coverage amount is paid upon the insured reaching a predetermined retirement age.

11. A system for managing an insurance policy, the system including:
at least one computer server including software executing within said at least one computer from non-transitory storage medium, the software configured to
store an initial interest rate level which is an interest rate level payable on debt of the insured person;
store policy information for a first benefit payable upon the occurrence of an insured event relating to disease, disability, or death, the first benefit configured to cover losses associated with the insured event;
store policy information for a second benefit payable upon the occurrence of the insured event, the second benefit configured to pay debt of the insured at the time of the insured event;
determine an interest rate level at the time of an occurrence of the insured event;
compare the determined interest rate level with the inception interest rate level;
calculate the second benefit amount to be paid to the insured person if the determined interest rate level is higher than the inception interest rate level, the second benefit amount based upon a predetermined notional number and the compared interest rate levels, the predetermined number not directly related to the first benefit amount; and
cause to pay the first and second benefit amounts to the insured person or their nominated beneficiary.

12. A system according to claim 11, further including:
a monitoring module to monitor the compliance of the insured person with a wellness program; and
the calculation module altering the second benefit amount based on the insured person's compliance with the wellness program.

13. The system of claim 12, wherein the monitoring is not performed by the insured.

14. The system of claim 11, wherein the interest rate is set by a government, regional authority, or financial institution not the insurer.

15. The system of claim 11, wherein the predetermined number is a notional value determined by the insured for a desired level of coverage.

16. The system of claim 11, wherein the predetermined number is based upon financial obligations of the insured.

17. The system of claim 11, wherein the second benefit amount is paid in installments over time.

18. The system of claim 11, wherein the second benefit amount is paid upon the insured reaching a predetermined retirement age.

19. A method for managing an insurance policy, the system including:
   using at least one computer server including software executing within said at least one computer from non-transitory storage medium, the software configured to
   store an initial level relating to at least one of a published price index, relative value between a local currency and a foreign currency, and an interest rate level published by a financial institution or regional authority;
   store an initial level relating to financial obligations of the insured;
   store policy information for a first benefit payable upon the occurrence of an insured event relating to disease, disability, or death, the first benefit configured to cover losses associated with the insured event;
   store policy information for a second benefit payable upon the occurrence of the insured event, the second benefit configured to pay at least a portion of the financial obligations of the insured beginning on or after the time of the insured event;
   determine a change in level of at least one of the published price index, relative value of the local currency and foreign currency, and interest rate level published by a financial institution or regional authority between the initial level and the level at about the time of an occurrence of the insured event;
   calculate the second benefit amount to be paid to the insured person based upon the determined change in level and the financial obligations of the insured; and
   cause to pay the first and second benefit amounts to the insured person or their nominated beneficiary.

20. The method of claim 19, wherein the software is further configured to change the calculated second benefit amount based upon compliance of the insured with a wellness program configured to improve the health of the insured.

* * * * *